Oct. 26, 1937. A. A. LINSELL 2,097,100
TEMPERATURE ACTUATED ELECTRICAL DEVICE
Filed March 17, 1931
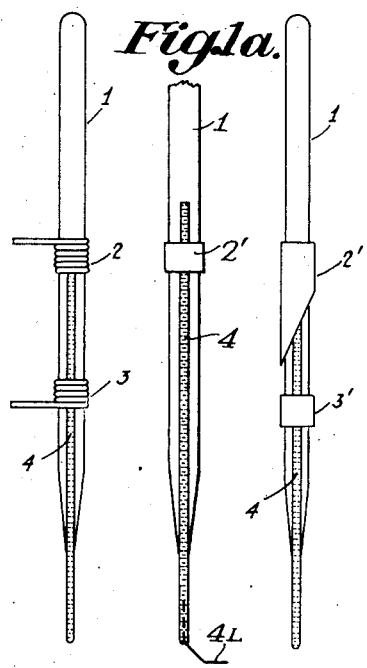
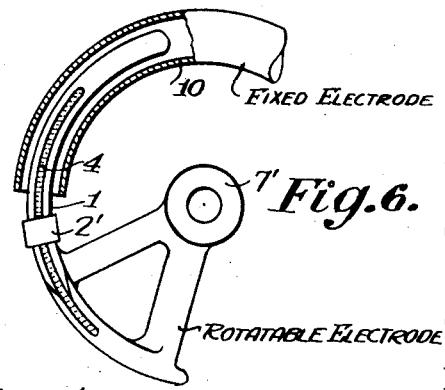
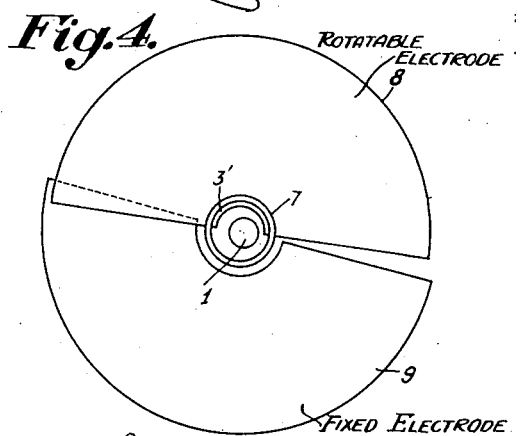
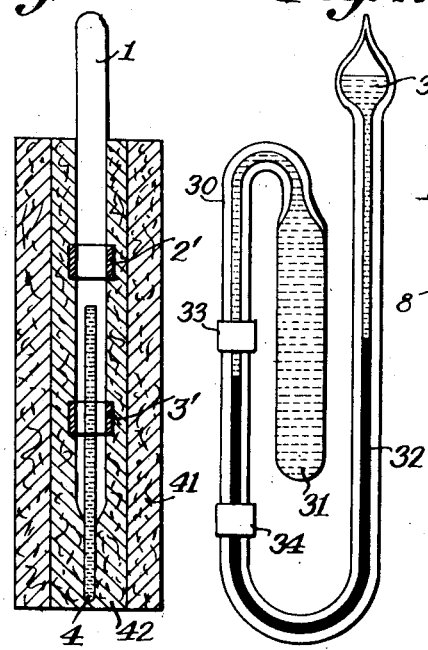
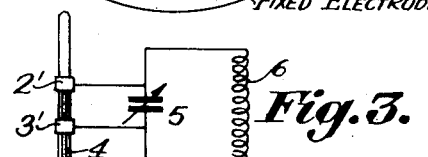
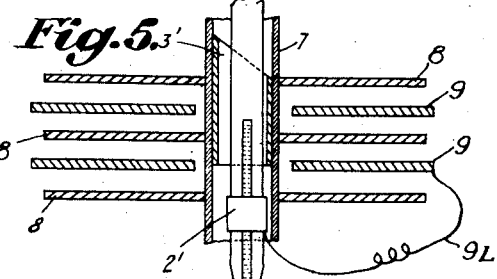
INVENTOR
ALFRED AUBYN LINSELL
BY
ATTORNEY Patented Oct. 26, 1937

2,097,100

UNITED STATES PATENT OFFICE 2,097,100

TEMPERATURE ACTUATED ELECTRICAL DEVICE

Alfred Aubyn Linsell, Brentwood, England, assignor to Radio Corporation of America, a corporation of Delaware Application March 17, 1931, Serial No. 523,276
In Great Britain March 17, 1930

4 Claims. (Cl. 175—41.5)

This invention relates to temperature actuated electrical devices.

The invention has for its principal object to provide a simple electrical device adapted to be actuated by changes in temperature which may be utilized, for example, for correcting for temperature variations in other apparatus. Although not limited in its application thereto, the invention is particularly suitable for use as a compensator for changes in frequency due to changes in temperature in oscillatory circuits.

According to this invention, a temperature actuated device suitable for use, for example, for purposes of temperature correction, comprises a thermometer and in conjunction therewith two or more electrodes one or both of which are in electrostatic association with the expanding column thereof, the arrangement being such that as expansion in the indicating column of the thermometer takes place, the capacity between the electrodes is varied.

It will be appreciated that since thermometers have already been developed into highly precise instruments their utilization in the present invention is particularly advantageous since their response to any particular temperature is substantially always the same and is moreover readily calculable.

The invention is illustrated in the accompanying drawing which shows various constructions in accordance therewith.

Figures 1, 1a and 2 show different forms of temperature control thermometric devices arranged in accordance with the present invention;

Figure 3 illustrates a circuit arrangement utilizing a type of device as shown in Figures 1, 1a and 2;

Figures 4 and 5 show variable condenser arrangements having temperature correcting devices combined therewith. In Figure 5 a capacity change in addition to that due to temperature change is produced;

Figure 6 is a modification of Figures 4 and 5, showing a thermometric device in an arcuate form;

Figure 7 shows a temperature control device of the maximum-minimum type; and

Figure 8 shows a vertical cross-section of a thermometric control device of this invention contained within a heat-insulating shield.

Referring to Figure 1 this shows a device comprising an ordinary mercury thermometer 1 having electrodes 2, 3 placed around the stem at different points along the length thereof so as to constitute in conjunction with the mercury column 4 a small condenser whose capacity varies with temperature.

The electrodes themselves may be simply constructed, being constituted, as shown in Figure 1, by coils of wire wrapped round the glass tube or alternatively, as shown in Figure 2, they may be constituted by tube sections 2', 3'. Various laws of correction may be obtained by suitably shaping the electrodes, for example by tapering or cutting them on a bias as shown in the case of the electrode 2' in Figure 2, or by making the electrodes of different lengths as also shown in Figure 2, different conditions may be satisfied.

Alternatively, as shown in Figure 1a, instead of both the electrodes being electrostatically associated with the mercury column 4 only one electrode 2' may be so associated, the other being connected directly to the said mercury e. g. by means of a wire 4L or other contact fused through the glass of the thermometer, preferably at or near the bulb.

A device in accordance with this invention may be advantageously employed in, for example, a precision frequency meter. It is also suitable, of course, for giving temperature readings at a distance removed from the thermometer or for controlling automatic devices for regulating temperature and for other purposes.

One way of employing a device arranged in accordance with this invention is shown diagrammatically in Figure 3. There the electrodes 2', 3' associated with the thermometer are connected in shunt across the main condenser 5 of a tuned circuit 5, 6 so as to compensate for decrease of the condenser capacity with rise of temperature. If the condenser is such that with rise in temperature the capacity of said condenser increases, or if the whole tuned circuit is such that the frequency tends to decrease with rise in temperature then the correction device may be adapted to give what may be termed a "negative" correction. In this case a thermometer 30 of the maximum/minimum type as shown by Fig. 7 (in which alcohol 31 is used as the expanding member) and in which a column of mercury 32 falls in one leg with rise of temperature, may be employed, the electrodes 33 and 34, of course, being electrostatically associated with the mercury column.

Where a device in accordance with this invention is employed for applying temperature correction to a circuit embodying a variable condenser, said device may conveniently be housed within the spindle upon which are mounted the moving plates of said variable condenser, said spindle being of course, bored out to receive the temperature correcting device.

An arrangement of this kind is shown in plan view in Figure 4 and in elevation in Figure 5.

Referring to these figures 1 represents a thermometer compensator having electrodes 2', 3', such compensator being housed within a hollow rotating spindle 7 which carries the movable plates 8 co-operating with the stationary plates 9 of a variable condenser. The electrode 2' is connected to the stationary plates 9 by means of a flexible lead 9L while the electrode 3' is carried by the spindle and operates as the second electrode of the compensator. This electrode may be shaped to give any desired law as indicated, and moreover if desired the thermometer may be mounted eccentrically as indicated by Fig. 4 within the member 7 so that on rotation different compensating capacities will exist at different values of the condenser plates 8, 9.

In a modification illustrated in Figure 6, the thermometer 1 is bent into the form of an arc and fixed to the rotating spindle of a variable condenser. One of the co-operating fixed electrodes is made in the form of an arcuate tube 10 within which the thermometer moves as the spindle 7' is rotated thus varying the added correctional capacity according to the position of the variable condenser.

It will be noted that arrangements in accordance with this invention enable a comparatively large variation in capacity compensation to be obtained by means of apparatus occupying a relatively small space. In certain cases it may be desired that the compensating effect should lag behind the actual temperature in the neighborhood of the compensator. In such a case the thermometer condenser unit or units employed may be shielded as shown by Fig. 8 by a material which is a good non-conductor of heat e. g., asbestos, and which is preferably also one having low heat capacity. Composite shields 41 and 42 constituted by alternate sheets of materials each having one of these properties may be employed.

Having thus described my invention, what I claim is:

1. A variable tuning device including a movable element and having in combination therewith an arcuate thermometric arrangement comprising a temperature responsive column within a tubular electrode of arcuate form, to form with said electrode a capacity, and means for moving said thermometer in and out of said tubular electrode in response to movement of the movable element of said variable tuning device.

2. A variable tuning device including a rotatable element for imparting motion to a movable part for tuning purposes, and means for producing an additional tuning effect comprising a thermometric condenser arrangement including a temperature responsive column adjacent an electrode positioned adjacent said rotatable element for movement by said rotatable element relative to said column.

3. A temperature operated variable capacity comprising in combination a filament of conducting fluid with a non-conducting tube, temperature operated means for displacing said filament along said tube, a conductive member outward of said tube and in electrostatic capacity relation with said filament, said conductive member having such shape as to provide a rate of change of capacity with temperature which varies with the displacement of said filament along said tube.

4. A temperature operated variable capacity having in combination a filament of conducting fluid, temperature operated means for moving said filament axially thereof, and a metallic element in electrostatic capacity relation with said filament and means for selectively fixing the position of said metallic element along said filament.

ALFRED AUBYN LINSELL.